United States Patent Office 3,127,334
Patented Mar. 31, 1964

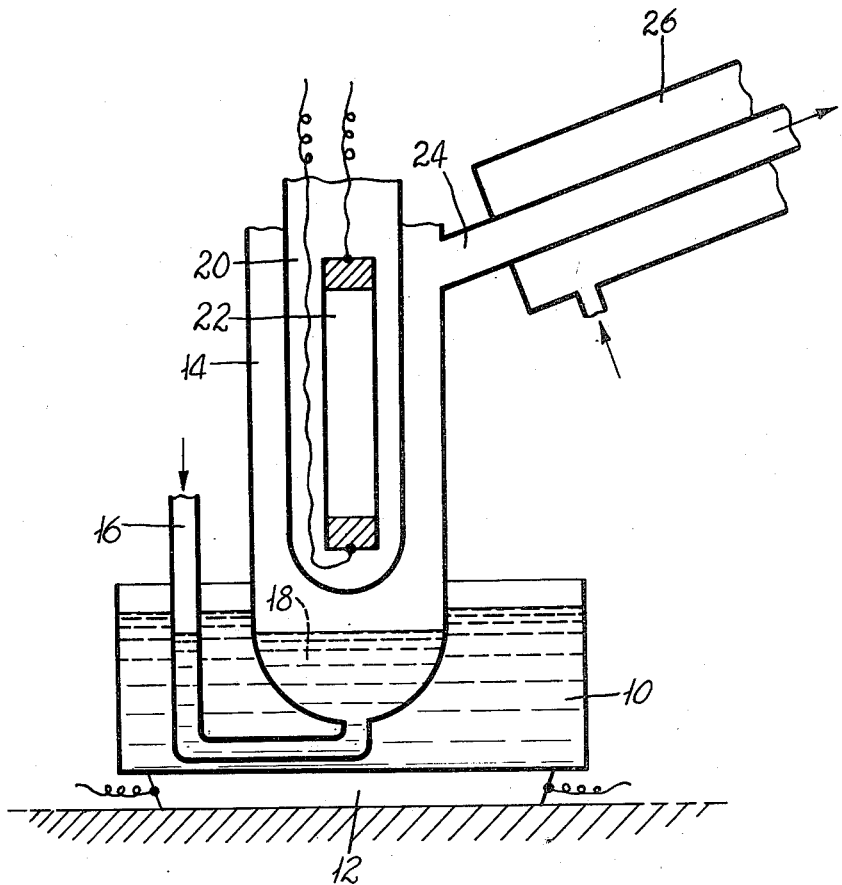

3,127,334
PRODUCTION OF LOWER VALENCE STATE
HALIDES AND OXYHALIDES
Karl H. Heffels, Buffalo, N.Y., assignor to Union Carbide
Corporation, a corporation of New York
Filed July 24, 1959, Ser. No. 829,330
4 Claims. (Cl. 204—157)

This invention relates to a process for the production of a lower valence state halide and oxyhalide from the corresponding higher valence state reactive, refractory metal halide or oxyhalide.

Lower valence state halides and oxyhalides are useful as catalysts in polymerization reactions, e.g., in the production of polyethylene. Their use for this purpose generally requires that they be in a substantially pure state so as to avoid undesirable reactions and product contamination.

One of the most commonly used methods for preparing these materials consists of reducing a higher valence state halide or oxyhalide to the corresponding lower valence state in the presence of hydrogen at temperatures generally on the order of 800° C. to 1200° C. However, severe corrosive conditions are encountered at these high temperatures which render this method generally undesirable.

Lower valence state halides and oxyhalides have also been produced by reducing the corresponding higher valence state material at low temperatures by employing reducing agents, such as zinc or aluminum. However, the use of such reducing agents results in the production of a by-product which affects the purity of the product and simplicity of the process.

It is an object of this invention to provide a process for the production of a lower valence state halide or oxyhalide from the corresponding higher valence state halide or oxyhalide, wherein low temperatures are employed without the use of reducing agents.

Other aims and advantages of this invention will be apparent from the following description and appended claims.

In accordance with this invention, a process is provided for the production of a compound selected from the group consisting of halides and oxyhalides of a metal selected from Groups IVB, VB, and VIB of the periodic table of the elements which comprises contacting the higher valence state compound corresponding to the selected-group member with gaseous hydrogen at a temperature substantially lower than the temperature necessary for the reactants to react spontaneously but above the condensation temperature of the reactants, and subjecting the gaseous mixture to ultraviolet radiation having a maximum wave length defined by the equation:

$$\lambda_{Max} = \frac{hcN}{\Delta H} = \frac{K}{\Delta H}$$

wherein $\Delta H$ = the molar enthalpy of the reaction
$h$ = Planck's constant
$c$ = the velocity of light
$N$ = Avogadro's number
$\lambda_{max}$ = the maximum useable wave length of radiation and $K$ = constant = $2.87 \times 10^5$ kcal.-A.-mole$^{-1}$ for a time sufficient to provide the amount of energy equivalent to the enthalpy of reaction at the temperature of the reaction. More specifically, by the process of the invention wherein titanium trichloride is produced from titanium tetrachloride, the suitable ultraviolet radiation wave length range has been found to lie between about 1800 A. and 3500 A.

The process of this invention is applicable to the production of a lower valence state halide or oxyhalide from the corresponding higher valence state halide or oxyhalide of the metals of Groups IVB, VB, and VIB of the periodic table of the elements, as presented in the "Handbook of Chemistry and Physics," 37th Edition, Chemical Rubber Publishing Company, pages 392 and 393.

In the drawing, an apparatus is shown that is suitable for use in practicing the present invention.

In the drawing, a bath 10 and associated heating means 12 are provided for reaction vessel 14. Reaction vessel 14 is provided with an inlet conduit means 16 for introducing a reducing gas into a higher valence state halide or oxyhalide 18 contained in reaction vessel 14. Transparent shield 20, positioned within reaction vessel 14, protects ultraviolet light source 22. Reaction vessel 14 is also provided with outlet conduit means 24. Conduct means 24 passes through condensing means 26.

In operation, reaction vessel 14 is purged with an inert gas, such as argon or helium, to remove any nitrogen, oxygen, hydrochloric acid, or any other contaminants present in the reaction vessel. A higher valence state halide 18, for example, titanium tetrachloride, is introduced into reaction vessel 14. A bath 10 is heated by heating means 12. Hydrogen gas is introduced into the reaction vessel means 14 through inlet conduit means 16. The resultant gaseous mixture, consisting of titanium tetrachloride vapor and hydrogen, is subjected to ultraviolet radiation supplied by ultraviolet light source 22 protected by transparent shield 20. The gaseous mixture reacts rapidly to form titanium trichloride and hydrogen chloride. The titanium trichloride remains in the reaction vessel and the hydrogen chloride along with any excess unreacted hydrogen and titanium tetrachloride enters outlet conduit means 24 and passes through condensing means 26, wherein the unreacted titanium tetrachloride is condensed and returned to reaction vessel 14. The acid and unreacted hydrogen can be collected in any suitable manner.

The reaction vessel 14 can be heated by any suitable heating means, such as an oil bath, steam furnace, electric furnace, and the like.

The higher valence state halide or oxyhalide charged to the reaction vessel is heated to produce vapors of the charged material. For example, if titanium tetrachloride is charged to the reaction vessel, it is heated to its boiling point temperature, i.e., about 136° C. It is preferred, however, in order to insure a rapid reaction, that the vapors of the charged material be heated to a temperature slightly above the boiling point. The heat necessary for raising the temperature of the vapor stream can be supplied both from the heating source and from the ultraviolet light.

Hydrogen gas is admitted to the system to provide a gaseous mixture of hydrogen and a halide or oxyhalide. One method suitable for admitting hydrogen gas to the system is to bubble the gas through the charged material. It is not critical to the success of this invention that this method be employed. The essential requirement is that the vapor of the charged material and the hydrogen gas are well mixed when they are subjected to ultraviolet radiation.

Upon subjecting the gaseous mixture to ultraviolet radiation, the gaseous mixture reacts rapidly to produce a lower valence state halide or oxyhalide and a hydrogen halide.

The amount of energy necessary to effect the reaction at $T_R$, the temperature of the reaction, is equal to the enthalpy for the controlling reaction and is determined by the equation:

$$\Delta H = \Delta H_p - \Delta H_R$$

wherein $\Delta H$=the molar enthalpy of reaction at the temperature $T_R$
$\Delta H_p$=the sum of molar enthalpies of the products at temperature $T_R$
$\Delta H_R$=the sum of molar enthalpies of the reactants To supply this energy for the reaction in the form of ultraviolet radiation which is to be absorbed by the reactants, the wave length of the radiation may not exceed that defined by the equation:

$$\lambda_{Max} = \frac{hcN}{\Delta H} = \frac{K}{\Delta H}$$

wherein $\Delta H$=molar enthalpy of the reaction, as previously defined
$h$=Planck's constant
$c$=velocity of light
$N$=Avogadro's number
$\lambda_{Max}$=maximum useable wave length of radiation and $K$=constant=$2.87 \times 10^5$ kcal.-A.-mole$^{-1}$ Radiation of greater wave lengths than that defined above, although possibly absorbed by the reactants will not cause the reaction to be initiated.

To determine the actual input of radiation necessary from any particular light source, in order to produce a given amount of product, it is necessary to consider the quantum yield of desired product obtained from each quantum of energy absorbed by the reactants. It is thus necessary to determine the spectral radiation of the light source to be employed; from this can be determined the amount of radiant energy available from the light source having a wave length less than the previously defined $\lambda_{max}$.

Intervening between the light source and the reactant mixture is a protective transparent shield. Generally, this shield consists of quartz glass or other ultraviolet transparent material. However, none of these shields are absolutely transparent, and it is necessary to determine the amount of the radiation of wave lengths less than $\lambda_{max}$, which will be absorbed by the shield. The difference between the amount of wave lengths available from the light source and that absorbed by the shield is a measure of the amount available for absorbtion by the reactants. From knowledge of the quantum yield, the amount of reactant to be treated, and the amount of light of useable wave lengths available for absorbtion, the power requirement of the light source can be determined.

The foregoing discussion may be suitably illustrated by the preparation of titanium trichloride. The primary and controlling reaction is:

$$TiCl_4 + h\nu \rightarrow TiCl_3 + Cl^*$$

In the equation, $h\nu$ represents a quantum of energy and the asterisk indicates that the atom is in an excited state. Once the primary reaction has been initiated, secondary reactions proceed spontaneously as follows:

$$H_2 + Cl^* \rightarrow HCl + H^*$$
$$TiCl_4 + H^* \rightarrow TiCl_{3(g)} + HCl$$
$$TiCl_{3(g)} \rightarrow TiCl_{3(s)}$$

From this it may be seen that the quantum yield is 2, since each quantum of energy produces 2 molecules of titanium trichloride.

At a temperature of 25° C., the enthalpy of $TiCl_{3(g)}$ is −129.8 kcal., of $TiCl_4$ is −183.0 kcal., and of chlorine is +29 kcal. (The last is only an approximation since the chlorine is not in the zero energy state but is in an excited state. However, the over-all effect of this approximation is small.) Hence, the enthalpy of reaction at this temperature is

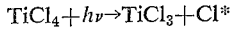

The maximum useable wave length of radiation at this temperature is determined as follows:

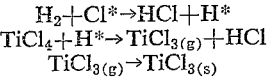

For a 450 watt high pressure Hanovia mercury lamp, the amounts of radiation having a wave length of 2200 to 3500 A. has been determined to be 18 percent of the input energy, which means that only this percentage of the input energy will usefully reach the titanium trichloride to initiate the reaction. Hence, the actual input of the lamp to the reaction system is 81 watts.

It should be noted that the foregoing is based on the assumption that the quartz tube remains uncoated and clear during the reaction. In actual practice, however, the titanium trichloride formed during the reaction tends to coat the tube, thereby cutting down on the actual useable radiation transmitted. If this coating is removed by scraping or other means or if it falls after a period of accumulation, the amount of radiation transmitted will then become the same as at the initiation of the reaction.

Any ultraviolet light source producing the amount of radiation necessary to effect the reaction can be used in this invention.

In the prior art processes, it was necessary that the equipment employed be fabricated from high temperature corrosion resistant materials; however, this is no longer a necessity, when the process of this invention is employed, since extremely corrosive conditions are minimized by operating at low temperatures. This not only assures the production of an uncontaminated product but also reduces the cost in producing the product. In addition to these advantages, when the lower valence state halide or oxyhalide is produced at these low temperatures, the tendency for the reaction products to decompose as they are formed is minimized. This is important, for example, when it is desired to deposit the chloride on a catalyst support. The activity of the catalyst may be seriously reduced by exposure to too high a temperature.

The following example is illustrative of the process of this invention. The apparatus employed was similar to that heretofore described and shown in the single figure of the drawing.

One hundred and twenty milliliters of pure titanium tetrachloride were charged to the apparatus. Argon was passed through the apparatus to purge the system of air. Hydrogen was subsequently passed through the system to replace the existing inert gas, and the temperature in the oil bath, in which the reaction vessel was placed, was raised to 160° C. The reaction temperature was 137° C. The gaseous mixture of titanium tetrachloride and hydrogen was subjected to ultraviolet light radiating about 18 percent of the total energy input in wave lengths below 3500 A. After exposure to the ultraviolet radiation for fifteen minutes, finely divided, violet-colored crystals of titanium trichloride were formed in the vessel. Upon completion of the experiment, 25 grams of pure titanium trichloride were obtained.

In another example of the invention, the apparatus employed being similar to that used in the previous example, 120 milliliters of pure vanadium oxytrichloride was charged to the apparatus. Argon was passed through the apparatus to purge the system of air. Hydrogen was subsequently passed through the system to replace the existing inert gas, and the temperature in the oil bath, in which the reaction vessel was placed, was raised to 200° C. The reaction temperature was 127° C. The gaseous mixture of vanadium oxytrichloride and hydrogen was subjected to ultraviolet light radiating about 18 percent of the total energy input in wave lengths below 3500 A. After exposure to the ultraviolet radiation for about ninety minutes the reaction vessel contained large amounts of dark green $VOCl_2$ crystals and lesser quantities of brownish $VOCl$ deposits.

What is claimed is:

1. A process for the production of a compound selected from the group consisting of halides and oxyhalides of a metal selected from Groups IVB, VB, and VIB of the periodic table of the elements, which comprises contacting a higher valence state compound corresponding to the selected-group member with gaseous hydrogen at a temperature substantially lower than the temperature necessary for the reactants to react spontaneously but above the condensation temperature of the reactants; subjecting said gaseous mixture to ultraviolet radiation having a maximum wave length defined by the equation:

$$\lambda_{Max} = \frac{hcN}{\Delta H} = \frac{K}{\Delta H}$$

wherein $\Delta H$ = the molar enthalpy of the reaction
$h$ = Planck's constant
$c$ = the velocity of light
$N$ = Avogadro's number
$\lambda_{Max}$ = the maximum useable wave length of radiation and $K$ = constant = $2.87 \times 10^5$ kcal.-A.-mole$^{-1}$ for a time sufficient to provide the amount of energy equivalent to the enthalpy of reaction at the temperature of the reaction.

2. A process for the production of titanium trichloride from titanium tetrachloride which comprises providing a gaseous mixture of hydrogen and titanium tetrachloride at a temperature above about 136° C. but substantially lower than the temperature necessary for the reactants to react spontaneously; subjecting said gaseous mixture to ultraviolet radiation having wave lengths between about 1800 A. and 3500 A. to produce said titanium trichloride.

3. A process for the production of a lower valence state vanadium oxychloride compound having a valence state less than 3 from vanadium oxytrichloride, which comprises providing a gaseous mixture of hydrogen and vanadium oxytrichloride at a temperature above about 126° C. but substantially lower than the temperature necessary for the reactants to react spontaneously; subjecting said gaseous mixture to ultraviolet radiation having wave lengths between about 1800 A. and 3500 A. to produce said lower valence state compound of vanadium oxychloride.

4. A process for the production of titanium trichloride from titanium tetrachloride which comprises providing a mixture of hydrogen and titanium tetrachloride at a temperature lower than that temperature necessary to obtain a substantial rate of spontaneous reaction and irradiating said mixture with ultraviolet light having wave lengths between about 1800 A. and 3500 A. to produce said titanium trichloride.

References Cited in the file of this patent

UNITED STATES PATENTS

| | | |
|---|---|---|
| 2,724,692 | Akerlof | Nov. 22, 1955 |
| 2,859,162 | Bown et al. | Nov. 8, 1958 |

OTHER REFERENCES

Ellis et al.: Chemical Action of Ultraviolet Rays (1941), page 30.

Canadian Journal of Chemistry, volume 35, No. 8 (August 1957), pages 850–859.